United States Patent
Zhang et al.

(10) Patent No.: US 9,902,617 B2
(45) Date of Patent: Feb. 27, 2018

(54) PRIMARY AMINE-CONTAINING POLYMERS USEFUL AS SCALE INHIBITORS

(71) Applicant: CYTEC INDUSTRIES INC., Woodland Park, NJ (US)

(72) Inventors: Lei Zhang, Stamford, CT (US); John Carr, Norwalk, CT (US); Haunn-Lin Tony Chen, Darien, CT (US)

(73) Assignee: Cytec Industries Inc., Princeton, NJ (US)

( * ) Notice: Subject to any disclaimer, the term of this patent is extended or adjusted under 35 U.S.C. 154(b) by 44 days.

(21) Appl. No.: 14/620,083

(22) Filed: Feb. 11, 2015

(65) Prior Publication Data

US 2015/0225241 A1 Aug. 13, 2015

Related U.S. Application Data

(60) Provisional application No. 61/938,235, filed on Feb. 11, 2014.

(51) Int. Cl.
*C01B 25/235* (2006.01)
*C08F 26/02* (2006.01)
(Continued)

(52) U.S. Cl.
CPC ............ *C01B 25/235* (2013.01); *C01B 25/22* (2013.01); *C02F 1/70* (2013.01); *C02F 5/12* (2013.01);
(Continued)

(58) Field of Classification Search
None
See application file for complete search history.

(56) References Cited

U.S. PATENT DOCUMENTS

| 3,062,612 A | 11/1962 | Le Boucher |
| 3,251,778 A | 5/1966 | Dickson et al. |

(Continued)

FOREIGN PATENT DOCUMENTS

| CN | 1724965 A | 1/2006 |
| CN | 1762857 A | 4/2006 |

(Continued)

OTHER PUBLICATIONS

International Search Report and Written Opinion of PCT/US2015/015412, dated May 13, 2015.
(Continued)

*Primary Examiner* — Wayne Langel
(74) *Attorney, Agent, or Firm* — Charles E. Bell, Esq.

(57) ABSTRACT

Processes for inhibiting scale produced during wet process phosphoric acid production by adding a scale-inhibiting amount of a reagent having a primary amine-containing polymer, or salt thereof, to one or more stages of a wet process phosphoric acid production stream are provided herein, wherein the primary amine-containing polymer includes an A mer according to Formula (I):

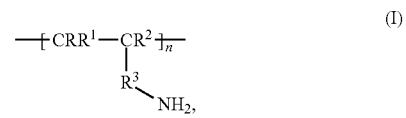

where
R is H, $C_1$-$C_6$ alkyl, $C_2$-$C_6$ alkenyl, halide, or carboxyl;
$R^1$ is H, $C_1$-$C_6$ alkyl, or $C_2$-$C_6$ alkenyl;
$R^2$ is H or an A mer according to Formula (I) as herein defined;
$R^3$ is chosen from a direct bond or a $C_1$-$C_{12}$ alkyl, $C_2$-$C_{12}$ alkenyl, or a $C_6$-$C_{12}$ aryl group; and
(Continued)

n is an integer chosen to provide a weight average molecular weight of the primary amine-containing polymer of at least 300 Daltons, and wherein the percentage of primary amines in the polymer is from 30 mole % to 100 mole % based on the total percentage of mer units in the polymer.

25 Claims, 1 Drawing Sheet

(51) Int. Cl.
*C08F 222/38* (2006.01)
*C01B 25/22* (2006.01)
*C02F 1/70* (2006.01)
*C02F 5/12* (2006.01)
*C23F 14/02* (2006.01)
*C23F 15/00* (2006.01)

(52) U.S. Cl.
CPC ............ *C08F 26/02* (2013.01); *C08F 222/38* (2013.01); *C23F 14/02* (2013.01); *C23F 15/005* (2013.01)

(56) References Cited

U.S. PATENT DOCUMENTS

| | | | |
|---|---|---|---|
| 3,258,428 A | 6/1966 | Dickson et al. | |
| 3,317,431 A | 5/1967 | Kaye | |
| 3,553,101 A | 1/1971 | Andrew | |
| 3,714,330 A | 1/1973 | Barker | |
| 3,796,790 A | 3/1974 | Sirianni et al. | |
| 3,835,215 A | 9/1974 | Marquis et al. | |
| 3,931,038 A | 1/1976 | Mochi-Bartolani et al. | |
| 3,972,981 A | 8/1976 | Harper et al. | |
| 4,049,774 A | 9/1977 | Harper et al. | |
| 4,221,769 A | 9/1980 | Harper et al. | |
| 4,277,359 A | 7/1981 | Lipinski | |
| 4,327,061 A | 4/1982 | Hermann et al. | |
| 4,328,106 A | 5/1982 | Harrar et al. | |
| 4,554,090 A | 11/1985 | Jones | |
| 4,563,284 A | 1/1986 | Amjad | |
| 4,952,327 A | 8/1990 | Amjad et al. | |
| 4,986,970 A | 1/1991 | Haraldsen | |
| 5,022,926 A | 6/1991 | Kreh et al. | |
| 5,080,801 A | 1/1992 | Molter et al. | |
| 5,120,519 A | 6/1992 | Gross | |
| 5,256,303 A | 10/1993 | Zeiher et al. | |
| 5,456,767 A | 10/1995 | Shah et al. | |
| 5,575,920 A | 11/1996 | Freese et al. | |
| 5,629,385 A | 5/1997 | Kuo | |
| 5,764,717 A | 6/1998 | Rootham | |
| 5,993,668 A | 11/1999 | Duan | |
| 8,900,539 B2* | 12/2014 | Ravishankar | C01B 31/0423 423/320 |
| 9,028,787 B2* | 5/2015 | Ravishankar | C01B 25/22 210/696 |
| 2009/0099328 A1 | 4/2009 | Heitner et al. | |
| 2011/0076218 A1* | 3/2011 | Ravishankar | C01B 25/22 423/316 |
| 2011/0076219 A1 | 3/2011 | Ravishankar et al. | |
| 2012/0171099 A1 | 7/2012 | Davis et al. | |
| 2012/0244058 A1 | 9/2012 | Ravishankar et al. | |

FOREIGN PATENT DOCUMENTS

| | | |
|---|---|---|
| EP | 0271035 B1 | 9/1993 |
| EP | 0677485 A1 | 10/1995 |
| GB | 1406884 | 9/1975 |
| GB | 1433123 | 4/1976 |
| GB | 2424876 B2 | 3/2011 |
| JP | H03197690 | 8/1991 |
| JP | 2002263690 A | 9/2002 |
| WO | 2004083118 A1 | 9/2004 |
| WO | 2009148866 A1 | 12/2009 |
| WO | 2011038108 A1 | 3/2011 |
| WO | 2011038167 A1 | 3/2011 |
| WO | 2012128755 A1 | 9/2012 |

OTHER PUBLICATIONS

International Preliminary Report on Patentability of PCT/US2015/015412, dated Aug. 16, 2016.

International Search Report of PCT/US2016/017565, dated May 12, 2016.

Written Opinion of PCT/US2016/017565, dated May 12, 2016.

International Search Report and Written Opinion for PCT/US2010/049983, dated Feb. 4, 2011.

International Search Report and Written Opinion for PCT/US2010/050086, dated Feb. 10, 2011.

International Search Report and Written Opinion for PCT/US2011/029319, dated Dec. 5, 2011.

A. William Frazier et al., "Chemical Behavior of Fluorine in Production of Wet-Process Phosphoric Acid;" Environmental Science & Technology; vol. 11; No. 10; 1977; pp. 1007-1014.

Lin-Jun Yang et al., Effect of Scale Inhibitor-Dispersant on the Crystallization of Potassium (Sodium) Fluosilicate Chemical Industry and Engineering; vol. 19, No. 1, 2002 (abstract).

A.D. Pandey et al., Prevention of Scale Deposition of Heat Exchanger Surfaces by Use of High Intensity Ultrasonic Waves during Concentration of Wet Process Phosphoric Acid; Fertiliser News; 28 (6); 1983, pp. 45-48.

Chuhua Wang et al., Enhanced Solubility of Sodium Fluorosilicate Scale by Magnetic Treatment, Florida Scientist; 1998; vol. 6 (1); pp. 17-25.

El-Shall H. et al., "Decreasing Iron Content in Wet-Process Phosphoric Acid: Final Report;" Florida Institute of Phosphate Research; Publication No. 01-154-171; Feb. 2001.

* cited by examiner

PRIMARY AMINE-CONTAINING POLYMERS USEFUL AS SCALE INHIBITORS

CROSS-REFERENCE TO RELATED APPLICATIONS

This application claims benefit of priority to U.S. Provisional Application No. 61/938,235, filed Feb. 11, 2014 the entire content of which is incorporated by reference herein.

BACKGROUND OF THE INVENTION

1. Field of the Invention

The present invention generally relates to inhibition of scale in industrial process streams. More particularly, the present invention relates to inhibiting scale (e.g., reducing or preventing the nucleation and/or growth of mineral scale solids) produced during operation of wet process phosphoric acid (WPA) production streams.

2. Description and Current Status of the Related Art

About 90% of the world's phosphoric acid is produced according to the wet process, which is conventionally prepared by acidulating phosphate rock (which contains calcium phosphate) with sulfuric acid to yield a crude wet-process phosphoric acid (WPA) and insoluble calcium sulfate (gypsum).

The manufacture of phosphoric acid is well known and is the subject of numerous text books. An overall view of the manufacture of phosphates and phosphoric acid is treated by Becker in *Phosphates and Phosphoric Acids*, Marcel Dekker, Inc. 1989; and by Slack in *Phosphoric Acid, Part 1 and Part 2*, Marcel Dekker, Inc. 1968. In the process, calcium phosphate rocks are cleaned in the wash plant and ground in the Ball mill before being fed into a series of reactors for digestion with sulfuric acid along with recycled phosphoric acid from the process. After digestion, the reaction slurry is filtered to separate phosphoric acid from gypsum. The filtered, crude WPA is then sent to clarifiers and evaporators for further purification and concentration. The purified phosphoric acid is either sent out as Merchant Grade Acid (MGA) or continued to make 69% $P_2O_5$ Super Phosphoric Acid (SPA), where it can be converted to many end products ranging from a chemical reagent, rust inhibitor, food additive, dental and orthopaedic etchant, electrolyte, flux, dispersing agent, industrial etchant, fertilizer feedstock, and component of home cleaning products. For example, crude phosphoric acid is concentrated to 54% ($P_2O_5$) before sent for Monoammonium Phosphate (MAP), Diammonium Phosphate (DAP), or ammonium phosphate-sulfate (APS) production.

As noted in U.S. Pat. No. 5,080,801 to Molter et al. (1992), which teaches various mixed polymers for preventing scale in mineral process waters from a variety of processes, due to the highly acidic environment which is inherent to phosphoric acid production, these plants experience scaling problems unique to this industry. Accordingly, solutions that may be useful for reducing or preventing scale in some industrial processes may not prove suitable for use in the phosphoric acid production stream. U.S. Pat. No. 5,456,767 to Shah et al. (1995) describes a similar sentiment with regard to the use of corrosion inhibitors in refinery overheads (noting that because the refinery overhead environment is extremely acidic, the corrosion inhibitors generally used in other oil field environments are not generally suitable for use with the refinery overheads).

Crude WPA contains significant amounts of dissolved impurities including carbonaceous matter, silica, and many metallic contaminants. Due to the supersaturated nature of the acid and the impurities in the phosphate ores, the concentration steps with respect to $P_2O_5$ render several side reactions, causing scale formation and/or deposition in and/or on the equipment in contact with the WPA at different stages of the phosphoric acid production process. For example, scale from the phosphoric acid production process forms on filter cloth and pipes, heat exchangers, evaporators, concentrators, valves, and pipes during the repetitive flashing/cooling/concentrating process of the phosphoric acid production process. Twelve to fifteen different types of scaling species can usually be found throughout the phosphoric acid production process and they pose significant challenges for the industry. Moreover, different phosphoric acid production plants experience different types of scale. Even within one plant, the type of scale can differ greatly between steps in the process or even between phosphate ore composition. Plants normally have to shut down production every few weeks to physically remove the scale using high-pressure water and/or mechanical means. Valuable operating time is lost during this descaling phase resulting in reduced process capacity and ultimately reduced profits.

While some proposed solutions have focused on physical means to remove scale formation and/or deposition on equipment surfaces in the phosphoric acid production process, most have tried to solve the problem by developing a chemical-based reagent. This is the preferred approach because it requires a limited amount of capital investment and does not alter the existing process in the phosphoric acid plants. It also does not require a large amount of reagent and is therefore considered both environmental, and to have a minimal downstream impact. However, due to the complexity of the scale forming issues (e.g., processes of nucleation, crystal growth, and deposition), it is a great challenge to develop reagents useful for inhibition of scale formation and/or deposition on surfaces in contact with digested phosphate rock.

For example, U.S. Pat. No. 5,120,519 (1992) discloses methods of preventing sodium fluorosilicate containing scales on surfaces in contact with digested phosphate rock such as in phosphoric acid production using certain anionically charged vinyl addition water soluble polymers containing from 5 mole % to 100 mole % of a an anionic vinyl monomer, and having a molecular weight of at least 1,000,000.

Chinese Patent No. 1762857 (2006) discloses a scale inhibitor agent for use in wet process phosphoric acid production, which contains mixtures of certain phosphoric or phosphonic acids as scale inhibitors with certain polymers or copolymers as scale dispersants, and a sterilizer compound.

Chinese Patent No. 1724965 (2006) discloses methods for descaling phosphoric acid concentration heat exchangers by employing a washing liquid containing a 5-20% fluosilicic acid solution, a phosphonic acid such as amino trimethylene phosphonic acid, hydroxyl ethylidene diphosphonic acid, and hydroxyl-1,1-ethylidene diphosphonic acid, and a film forming matter that includes nitrous phenylhydroxylamine ammonium salt, urotropine, and sodium molybdate.

Several patents to Harper et al. (U.S. Pat. No. 3,972,981 (1976) and U.S. Pat. No. 4,221,769 (1980); and GB Patent Nos. 1,406,884 (1975) and 1,433,123 (1976)) disclose processes for reducing the deposition of gypsum or calcium sulphate scale during the washing of the hemihydrate filter cake in a wet process phosphoric acid production stream by bringing the anhydrite or hemihydrate crystals into contact with various surface-active agents after the crystals have been formed, but before or during the washing thereof, thereby indicating that the point of incorporation of the additive affects the extent of scale inhibition achieved.

Several patent applications assigned to Cytec Industries Inc. have also addressed scale inhibition in wet process phosphoric acid production by using various chemical reagents. In U.S. Published Application No. 2011/0076218, methods are disclosed for inhibiting scale by adding a reagent having an aliphatic or aromatic compound having two or more hydroxyl groups, and at least one amine. Other suitable reagents disclosed include polyethyleneimine, or derivatives thereof, and other polyamines.

In U.S. Published Application Nos. 2011/0076219 and 2012/0244058 methods for preventing or reducing scale in wet process phosphoric acid production processes using various water-soluble functional organic reagents including certain polymers and/or copolymers are disclosed. This work has resulted in PHOSFLOW® Scale Inhibitor (commercially available from Cytec Industries Inc., Woodland Park, N.J.).

The economic impact for the scale-related issues is substantial, and the industry is in need of a more efficient scale prevention technology than the existing physical means of post-scale formation removal. However, while the various chemical-based reagents discussed above may have some merits and applicability in wet process phosphoric acid production, they are not currently in widespread use. Accordingly, the compositions and methods presently available for inhibiting the formation and/or deposition of scale in the phosphoric acid production process require further improvement. Compositions and formulations that effectively prevent and/or reduce (i.e., inhibit) formation and/or deposition of scale on equipment surfaces in contact with scale-forming ions released from digested phosphate rock, thereby enabling the phosphoric acid production plant to run longer without shutting down to physically remove scale, would be a useful advance in the art and could find rapid acceptance in the industry.

SUMMARY OF THE INVENTION

The forgoing and additional objects are attained in accordance with the principles of the invention wherein the inventors detail the surprising discovery that certain primary amine-containing polymers are effective for inhibiting scale resulting from wet process phosphoric acid production.

Accordingly, in one aspect the present invention provides processes for inhibiting scale produced during wet process phosphoric acid production by adding a scale-inhibiting amount of a reagent that includes a primary amine-containing polymer, or salt thereof, to at least one stage of the phosphoric acid production process, wherein said primary amine-containing polymer comprises an A mer according to Formula (I):

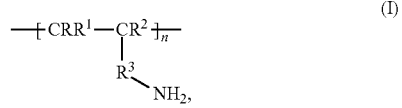

where
R is H, $C_1$-$C_6$ alkyl, $C_2$-$C_6$ alkenyl, halide, or carboxyl;
$R^1$ is H, $C_1$-$C_6$ alkyl, or $C_2$-$C_6$ alkenyl;
$R^2$ is H or an A mer according to Formula (I);

$R^3$ is chosen from a direct bond or a $C_1$-$C_{12}$ alkyl, $C_2$-$C_{12}$ alkenyl, or a $C_6$-$C_{12}$ aryl group; and
n is an integer chosen to provide a weight average molecular weight of the primary amine-containing polymer of at least 300 Daltons and wherein the percentage of primary amines in the polymer is from 30 mole % to 100 mole % based on the total percentage of mer units in the polymer.

As more fully described below, in certain embodiments the primary amine-containing polymer can have one or more organic moiety present at one or more substitutable positions of the polymer. In the same or other embodiments, the organic moiety (i.e., substituent) effectively reduces the solubility of the primary amine-containing polymer in an aqueous environment as compared to its native form (i.e., without the organic moiety, or moieties as the case may be).

In another aspect, the present invention provides processes for inhibiting scale produced during wet process phosphoric acid production by adding a scale inhibiting amount of a reagent that is a primary amine-containing polymer to at least one stage of a wet process phosphoric acid production process, wherein said primary amine-containing polymer (e.g., a branched polyethyleneimine) includes one or more organic moieties that reduce the polymer's solubility in an aqueous environment as compared to its native form, thereby reducing or preventing scale in the wet process phosphoric acid production process.

These and other objects, features and advantages of this invention will become apparent from the following detailed description of the various embodiments of the invention taken in conjunction with the accompanying Figures and Examples.

BRIEF DESCRIPTION OF THE DRAWINGS

So that the manner in which the above-recited features of the present invention can be understood in better detail, a more particular description of the invention may be had by reference to embodiments, some of which are illustrated or captured in the appended figures. It is to be noted, however, that the appended figures represent only typical embodiments of this invention and should not be considered limiting of its scope, for the invention may admit to other equally effective embodiments.

DETAILED DESCRIPTION OF CERTAIN EMBODIMENTS OF THE INVENTION

Figure 1:
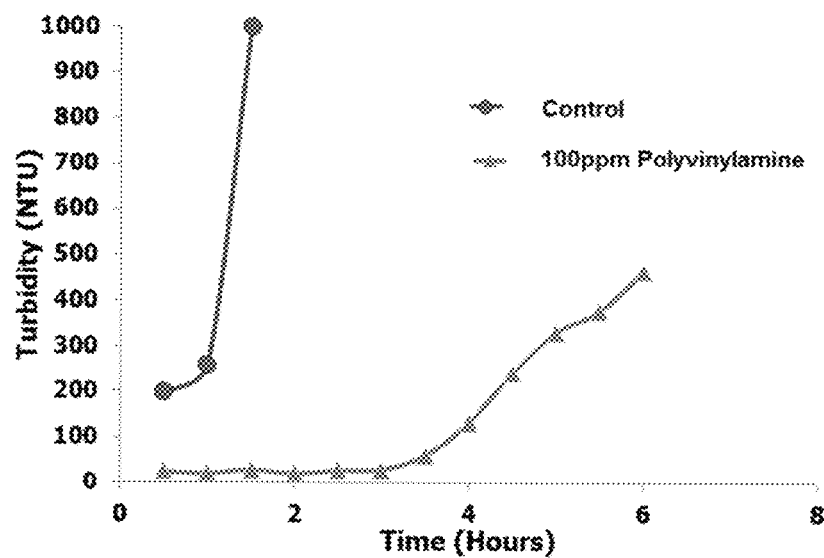
FIG. 1 graphically illustrates a comparison of induction time to scale formation between control phosphoric acid (i.e., phosphoric acid not treated with a primary amine-containing polymer according to the invention) (●), and treated phosphoric acid (i.e., phosphoric acid treated with 100 ppm of a primary amine-containing polymer as described herein (poly(vinylamine)) (▲) as a measure of turbidity (NTU) vs. time in hours. The turbidity test utilized is exemplified below. As shown by the graph, the induction time to scale formation is increased in the phosphoric acid sample containing a primary amine-containing polymer according to the invention, which correlates to an inhibition of scale produced in a wet process phosphoric acid production stream.
Figure 2:
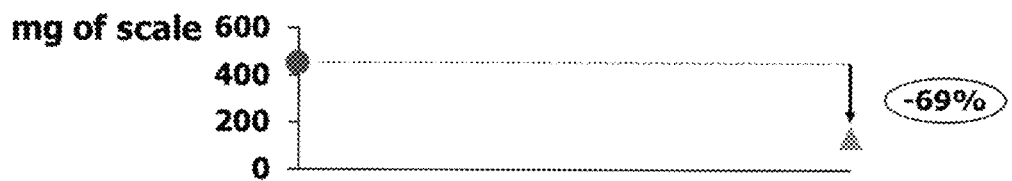
FIG. 2 illustrates the mass of scale generated from phosphoric acid samples treated with or without reagent. The graph conveys a 69% decrease in mass of scale generated between control phosphoric acid (i.e., without reagent) (●), and phosphoric acid treated with 100 ppm of a primary amine-containing polymer as described herein (▲).

As summarized above, the present invention is based at least in part on the discovery that certain primary amine-containing polymers are useful for inhibiting scale produced during wet process phosphoric acid production. The formation of scale in this industrial process results from the release of scale-forming ions from crushed and digested phosphate rock. Scale deposition on equipment surfaces in contact with the digested phosphate rock is problematic and eventually necessitates shut down of the production process for cleaning and/or de-scaling the equipment. Controlling scale via a reduction of scale formation and/or deposition on surfaces in contact with scale-forming ions released from digested phosphate rock translates to greater time between shut downs, which in turn provides greater efficiency and production capacity.

As employed throughout the disclosure of the invention, the following terms are provided to assist the reader. Unless otherwise defined, all terms of art, notations and other scientific or industrial terms or terminology used herein are intended to have the meanings commonly understood by those of skill in the chemical arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise.

Throughout this specification, the terms and substituents retain their definitions. A comprehensive list of chemical abbreviations commonly utilized in the field appears in the first issue of each volume of the *Journal of Organic Chemistry*. The list, which is typically presented in a table entitled "Standard List of Abbreviations," is incorporated herein by reference.

The terms "hydrocarbon" or "hydrocarbyl" are broad terms that are used herein in their ordinary sense as understood by those skilled in the art, and include aliphatic, alicyclic, and aromatic organic compounds or radicals having an all-carbon backbone and consisting of carbon and hydrogen atoms. Such moieties can be saturated, or be mono-, or poly-unsaturated. Examples of these moieties include alkyl, cycloalkyl, alkenyl, alkynyl, and aryl ranging from 1 to 36 carbon atoms, wherein moieties having from 1 to 22 carbon atoms are preferred. Such moieties can be substituted at one or more substitutable positions by a substituent defined herein. Specific examples of hydrocarbons include any individual value or combination of values selected from $C_1$ through $C_{36}$ hydrocarbon moiety or hydrocarbyl group.

As used herein, the term "alkyl" means a straight or branched chain hydrocarbon radical generally containing from 1 to 36 carbon atoms. Alkyl groups having from 1 to 22 carbon atoms are preferred, with alkyl groups having 1 to 18 carbon atoms being most preferred. While particular examples include any individual value or combination of values selected from $C_1$ through $C_{36}$, preferred representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, n-heptyl, n-octyl, tert-octyl, n-nonyl, n-decyl, etc.

The term "alkenyl" means a straight or branched chain hydrocarbon radical containing from 2 to 36 carbons, with 2-22 carbon atoms being preferred, and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, 3-decenyl, etc.

"Halides" refer to ionic compounds containing a halogen (e.g., fluorine, chlorine, bromine or iodine).

The term "aryl" (carbocyclic aryl) refers to a 6-membered aromatic radical carbocycle ring, or a polycyclic aromatic radical as the case may be, having from 6 to 24 carbon atoms, with 6-18 carbons being preferred. The aromatic carbocyclic rings include, e.g., substituted or unsubstituted phenyl groups, benzene, naphthalene, indane, tetralin, etc. As one of skill in the art would appreciate, the term "substituted" refers to the replacement of one or more H atoms by a heteroatom (N, S, or O) or other functionality (e.g., a hydrocarbyl chain) that does not interfere with the intended purpose of the group on which the substitution is incorporated.

The term "substituted", whether preceded by the term "optionally" or not, is used herein in its ordinary sense as understood by those skilled in the art and, thus, includes replacement of one or more hydrogen or other suitable atom (i.e., substitutable position) in a given polymer, compound, or structure with one or more organic moiety or functionality that may be the same or different. Such moiety that replaces the hydrogen or other suitable atom is referred to herein as a "substituent". As one of skill in the art will appreciate, these terms can also refer to, in certain contexts, the replacement of one or more carbon atoms in a hydrocarbon chain by a heteroatom (N, S, or O). In either case, the substituent does not interfere with the intended purpose of the polymer, compound, or structure on which the substituent is incorporated.

Exemplary substituents that can be present at one or more substitutable positions of a polymer, compound, or structure include, but are not limited to, a hydrocarbyl moiety that can be further optionally substituted with one or more substituents independently chosen from OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1\text{-}12}$ alkylamino; $C_{1\text{-}12}$ dialkylamino; anilino; mercapto; $C_{1\text{-}12}$ alkylthio; sulfoxide; sulfone; $C_{1\text{-}12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy and heteroaryloxy.

"Polymer" refers to the polymerization product of two or more monomers and is inclusive of homo-, co-, ter-, tetra-polymers, etc. in any configuration (e.g., alternating, periodic, random, block, or graft) or arrangement (e.g., linear or branched). In certain contexts, the term "modified polymer" can refer to the polymer being substituted at one or more substitutable position by one or more organic moieties. The term "native polymer" then just refers to the polymer without the organic moiety (i.e., unsubstituted).

The term "mer" or "mer unit" means that portion of a polymer derived from a single reactant molecule (i.e., monomer precursor compound), or which is formed from a post-polymerization reaction such as, for example, by hydrolysis. Thus, reference to "A mer" just means that portion of the polymer derived from reactant A directly, or formed during a post-polymerization reaction into an A mer unit, whereas "B mer" refers to another portion of the polymer derived from reactant B directly, or formed during another post reaction into a B mer unit.

Terms used to describe the reagents referred to herein, such as "anti-scalant" or "scale inhibitor," refer to chemical compounds, including salts thereof, and/or mixtures thereof, that are effective for delaying or preventing nucleation or supersaturation of mineral scale species, or reducing, removing, and/or eliminating existing scale in the phosphoric acid process stream.

In a first aspect, the scale inhibiting reagents for use in accordance with the invention include a primary-amine containing polymer, or salt thereof, which in a first aspect includes an A mer according to Formula (I):

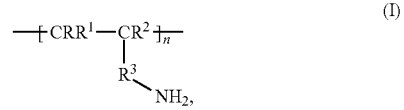

(I)

where

R is H, $C_1$-$C_6$ alkyl, $C_2$-$C_6$ alkenyl, halide, or carboxyl;

$R^1$ is H, $C_1$-$C_6$ alkyl, or $C_2$-$C_6$ alkenyl;

$R^2$ is H or an A mer according to Formula (I) as defined herein;

$R^3$ is chosen from a direct bond or a $C_1$-$C_{12}$ alkyl, $C_2$-$C_{12}$ alkenyl, or a $C_6$ $C_{12}$ aryl group; and n is an integer chosen to provide a weight average molecular weight of the primary amine-containing polymer of at least 300 Daltons, and wherein the percentage of primary amines in the polymer is from 30 mole % to 100 mole % based on the total percentage of mer units in the polymer.

In certain embodiments, R and $R^1$ are H, and $R^3$ is a direct bond. In certain embodiments where $R^3$ is a direct bond, the A mer is vinyl amine monomer and the primary amine-containing polymer is polyvinylamine homopolymer, or a salt thereof.

In other embodiments, $R^3$ is present and is chosen from a $C_1$-$C_{12}$ alkyl group. In certain embodiments where $R^3$ is present, R and $R^1$ are H and $R^3$ is $CH_2$. In certain embodiments where $R^3$ is $CH_2$, the A mer is allylamine monomer and the primary amine-containing polymer is polyallylamine homopolymer, or a salt thereof.

In some embodiments, the primary amine-containing polymers described herein can be derived by (co)polymerization of monomers (A mer) including primary amine groups such as allylamine and vinylamine. These monomers can be polymerized with one or more B mer to form copolymers having primary amine groups. B mers can be incorporated into the primary amine-containing polymers of the present invention according to any suitable means, e.g., by copolymerization, hydrolysis (full or partial) of the primary amine-containing polymer, or by post-reaction.

In certain embodiments, the primary amine-containing polymer includes B mer units according to Formula (II)

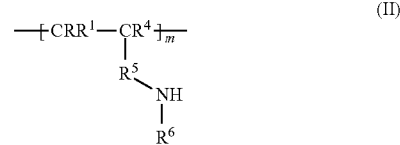

(II)

wherein

R and $R^1$ are as defined for the A mer according to Formula (I);

$R^4$ is chosen from H or $C_1$-$C_4$ alkyl;

$R^5$ is chosen from a direct bond or a $C_1$-$C_{12}$ alkyl, $C_2$-$C_{12}$ alkenyl, or a $C_6$-$C_{12}$ aryl group;

$R^6$ is chosen from a $C_1$-$C_{22}$ alkyl, $C_2$-$C_{22}$ alkenyl, or $C_6$-$C_{22}$ aryl group, which groups are optionally substituted at one or more substitutable positions; and m is chosen from 1 mer unit to 70 mole % based on the total number or percentage of mer units in the polymer.

As used herein, the term "optionally substituted" with reference to a particular moiety (i.e., alkyl, alkenyl, aryl, etc.) means that in certain embodiments the moiety can be substituted or unsubstituted, as the case may be. In those embodiments where the moiety is substituted, up to three substitutable positions in the moiety are replaced with one or more of the following: OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy and heteroaryloxy. When the moiety that is substituted contains an alkyl segment/chain, two hydrogen atoms on the same carbon atom may be replaced by a single substituent double bonded to the carbon atom, e.g, oxo (=O). While the substituents that contain carbon atoms typically contain from 1 to about 10 carbon atoms, those skilled in the art will appreciate that in certain embodiments, for example where the substituent is epoxy (such as alkoxyalkylepoxy), the number of carbon atoms can be as great as 32.

In other embodiments, the B mer unit is an amide monomer having from 3-36 carbon atoms, with 3-22 carbons being preferred. Suitable examples include, but are not limited to, poly-(dipropyl)(meth)acrylamide; N-butyl(meth)acrylamide; N,N-di-butyl(meth)acrylamide; N-hexyl(meth)acrylamide; N-benzyl(meth)acrylamide; N-cyclohexyl(meth)acrylamide; N-tert-octyl(meth)acrylamide; N-dodecyl(meth)acrylamide; N-octadecyl(meth)acrylamide; etc. As will be understood by those of skill in the art, any reference to the term "(meth)" includes the moiety with or without the methyl portion. For example, reference to "N-butyl(meth)acrylamide" includes N-butylacrylamide and N-butylmethacrylamide. Such monomers can also be incorporated into the primary amine-containing polymer by copolymerization.

In certain embodiments, the B mer is incorporated via copolymerization and is a monomer chosen from diallylamine, diallyldimethylammonium chloride, acrylamide, N-methylolacrylamide; N-($C_1$ to $C_{22}$)alkyl acrylamide, N,N-di-($C_1$ to $C_{22}$)alkyl acrylamide, hydroxy alkyl(meth)acrylamide, N-vinylformamide; N-($C_1$ to $C_{22}$)alkyl-N-vinylformamide, N-vinyl acetamide, N-($C_1$ to $C_{22}$)alkyl-N-vinylacetamide, N-vinyl propionamide, N-($C_1$ to $C_{22}$)alkyl-N-vinyl propionamide, vinylformamide, (meth)acrylate, (meth)acrylic acid, the esters, nitriles, or amides of (meth) acrylic acid, vinyl acetate, vinyl propionate, vinyl alcohol, ($C_1$ to $C_{22}$)alkyl vinyl ethers, vinylpyrrolidone, polyether amine, or copolymers of any of the foregoing. In various embodiments, B mer units having alkyl chain side groups from $C_6$-$C_{22}$ are preferred. As will be understood by those of skill in the art, any mer unit including the term "(meth)"

includes the mer unit with or without the (meth) portion. For example, the term "(meth)acrylate" includes acrylate or methacrylate.

In other embodiments, B mer units are incorporated into the primary amine-containing polymers according to the present invention via post-reaction. Suitable reactants for carrying out post-reaction incorporation of B mers include, but are not limited to, amine reactive compounds such as alkyl halides (e.g., chlorides, bromides, and iodides of alkyls such as methyl, ethyl, propyl, butyl, pentyl, hexyl, octyl, decyl, dodecyl, undecyl, etc.), alkenyl halides such as allyl chloride, aralkyl halides such as benzyl chloride, alkyl sulfates such as dimethyl sulfate, compounds containing at least one epoxide group (e.g., glycidyl alcohols, phenols, and amines), acids, acid anhydrides (e.g., malonic anhydride, succinic anhydride), acyl halides, aldehydes and ketones, isocyanates (e.g., isocyanatopropyl or isocyanatomethyl that react to form a urea linkage) and thioisocyanates, activated double bond sites, cyanamides, guanidines, and urea. Specific examples of nitrogen-reactive groups include, for example, chloropropyl, bromoethyl, chloromethyl, bromoundecyl, glycidoxypropyl, 1,2-epoxyamyl, 1,2-epoxydecyl, 3,4-epoxycyclohexylethyl, alkenyl malonic anhydrides, alkenyl succinic anhydrides and combinations of such groups, e.g., a combination of a hydroxyl group and a halide, such as 3-chloro-2-hydroxypropyl. Examples of preferred second nitrogen-reactive compounds include dimethylsulfate, chlorooctane, chlorohexane, benzyl chloride, epichlorohydrin, glycidyl 4-nonylphenylether, butyl glycidyl ether, 2-ethylhexyl glycidyl ether, phenyl glycidyl ether, $C_{12}$-$C_{14}$ alkyl glycidyl ether, cresyl glycidyl ether, octenylsuccinic anhydride and octadecenylsuccinic anhydride. In some embodiments, the second nitrogen-reactive compound includes at least two nitrogen-reactive functionalities, which may be the same or different from one another.

In still other embodiments, the primary amine-containing polymers can be derived by hydrolysis of polyvinylamides such as the hydrolysis of products of polyvinylacetamide or polyvinylformamide. The degree of hydrolysis can be from 30% to 100% or any specific value therebetween. When the degree of hydrolysis is 100%, homopolyamines are formed (i.e., a primary amine-containing polymer, wherein the percentage of A mer units is 100%). In those embodiments where the degree of hydrolysis is less than 100%, the B mer units comprise the unhydrolyzed polyvinylamide moieties (e.g., polyvinylacetamide or polyvinylformamide). These partially hydrolyzed polyvinyl amides are well known in the art, as well as commercially available, and do include both primary amines and amide pendant groups. Accordingly, the use of fully/partially hydrolyzed polyvinylacetamide and/or fully/partially hydrolyzed polyvinylformamide as scale inhibitors are both specifically contemplated as primary amine-containing polymers according to the present invention.

In one specific embodiment, when the A mer is vinylamine monomer, the B mer is vinylformamide monomer and the primary amine-containing polymer is poly(vinylamine-co-vinylformamide) copolymer. In another specific embodiment, the primary amine-containing polymer includes an A mer and two different B mers to form a primary amine-containing terpolymer. One such terpolymer contemplated for use in the present invention includes, but is not limited to, poly(vinylamine-co-vinylformamide-co-diallyldimethylammonium chloride), or a salt thereof.

In other embodiments, the primary amine-containing polymers according to the invention can include a B mer unit having an alkyl chain side group. In preferred embodiments, the B mer unit is chosen from a N-($C_6$ to $C_{22}$)alkyl acrylamide. In a specific embodiment, the primary amine-containing polymer can be a poly(vinylamine-co-vinylformamide-co-N-t-octylacrylamide), or a salt thereof.

Those skilled in the art will appreciate that any of the mer units or primary amine-containing polymers according to the invention can be protonated and that numerous counterions are contemplated by the term "or salts thereof" as used herein. Counterions that may be paired with mer units or polymers defined herein include, but are not limited to, chloride, fluoride, bromide, iodide, nitrate, sulfate, sulfonate, sulfinate, carbonate, carboxylate (e.g. citrate, succinate, maleate), phosphate, phophonate, and phosphinate. It will be further understood that such salt forms can be prepared by addition of the suitable acid to the mer unit or polymer. For the avoidance of doubt, it is to be understood that references to the mer units or polymers throughout the specification and claims include the compound in the form of salts, as well as in the free form.

As indicated by the foregoing references to the polymer, the inventors have made the surprising discovery that the polymers suitable for use in inhibiting scale formation and/or deposition on surfaces in contact with scale-causing ions generated during wet process phosphoric acid production must contain primary amines. Polymers containing secondary or tertiary amines are not effective for preventing or reducing scale in such a process. While the percentage of primary amines required for effective inhibition of scale may differ from process to process, in one embodiment the percentage of primary amines in the polymer (i.e., the percentage of primary amine containing mer units based on the sum of all mer units in the polymer) ranges from 30 mole percent to 100 mole percent. In another embodiment, the percentage of primary amines contained in the polymer is preferably from 60 mole percent to 100 mole percent. As those skilled in the art will appreciate, the contemplated range is inclusive of the lowest value and the highest value, and of any specific value there between (e.g., 30, 31, 32, 33, et seq. up to and including 100 mole percent). Thus, when the B mer unit is present it can range from 1 mer unit to 70 mole percent, and preferably ranges from 40 mole percent to 55 mole percent when present. Again, those skilled in the art would recognize that the contemplated percentage of B mer units is inclusive of the lowest value and the highest value, as well as any specific value in between (e.g., 1 mer unit, 2 mer units, 3 mer units, et seq. up to and including 70 mole percent).

The primary amine-containing polymers described herein can be linear or branched. For example, in certain embodiments $R^2$ is an A mer as defined herein above, and the polymer is branched.

The primary amine-containing polymers described herein for the practice of the present invention should be at least 300 Daltons, regardless of whether the polymer is a linear or branched homopolymer (i.e., contains only A mer units), copolymer (i.e. contains A mer units and B mer units), random polymer, or block polymer. Efficacy of the polymer is not diminished by higher molecular weight, although those skilled in the art will appreciate that polymers having molecular weights in excess of 15 million Daltons, while not outside the scope of the invention, are difficult to produce commercially, or will be cost prohibitive. Accordingly, values for the variable n in A mer units of Formula (I) and m in B mer units of Formula (II) can be selected from any integer or number of mer units until the desired weight average molecular weight and/or mole percentage of primary amine is obtained. Those ordinarily skilled in the art will be able to readily ascertain the proper value for n and/or m, as the case may be, based on the desired characteristics of the polymer using no more than routine methods.

While those of ordinary skill in the art are familiar with general polymerization techniques, the polymers described herein can be made using the general techniques and teachings described in *Principles of Polymerization* 4$^{th}$ Ed. by George Odian (2004). Additionally, synthesis pathways for several specific primary amine-containing polymers contemplated for use with the present invention are exemplified below. These pathways can also be generalized to achieve the other primary amine-containing polymers contemplated for use as scale inhibitors according to the invention.

In another aspect, the scale inhibiting reagents for use in accordance with the processes of the invention described herein include a primary amine-containing polymer, or salt thereof, having one or more organic moieties attached thereto, wherein the moiety, or moieties as the case may be, effectively reduce the polymer's solubility in an aqueous environment as compared to its native form. Such modified polymers are believed to be effective for inhibiting scale when added to at least one stage of the wet process phosphoric production process.

While any primary amine-containing polymer is suitable as a reagent, the polymer must be modified (i.e., substituted) such that one or more moieties (whether alone or in concert) impart a reduction in the solubility of the polymer in an aqueous environment as compared to the unmodified polymer. In some embodiments, the primary amine-containing polymer can be polyethyleneimine. While the polyethyleneimine can have a number average molecular weight of 300 Da or greater, in certain embodiments it is preferable that the number average molecular weight of the polyethyleneimine is from 1,800 Da to 100,000 Da. As the polymer is required to contain a primary amine, those skilled in the art will appreciate that the polyethyleneimine polymers suitable for use with the processes described herein must be branched.

While the organic moiety, or moieties as the case may be, can generally take the form of any structure, in certain embodiments one or more of the moieties can be chosen from $R^6$ as defined above. Thus, in certain embodiments the one or more organic moieties can be a hydrocarbyl moiety having from 1 to 22 carbon atoms, which moieties can be optionally substituted with one or more substituent chosen from OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; or heteroaryloxy.

As those skilled in the art will appreciate, when the organic moiety is chosen from a lower alkyl, for example, this may be insufficiently greasy to impart the required reduced solubility of the polymer in an aqueous environment, unless there are a sufficient number of organic moieties present on the polymer. In such cases the organic moiety, or one or more of the moieties as the case may be, can be further substituted with one or more optional substituents.

In certain embodiments, the organic moiety can be present in more than one instance. In the same or other embodiments, the organic moieties can be independently chosen from a $C_8$-$C_{22}$ hydrocarbyl. In some embodiments, one or more of the organic moieties can be octyl that can be derived from an alkyl halide moiety such as octylchloride. In the same or other embodiment, one or more of the organic moieties can be dodecyl that can also be derived from an alkyl halide, such as dodecylbromide.

In another embodiment, one or more organic moieties can be derived from a linear or branched glycidyl ether such as octyl-, decyl-glycidyl ether or 2-ethylhexyl-glycidyl ether, and can be C8-C12-oxybutan-2-ol as represented by:

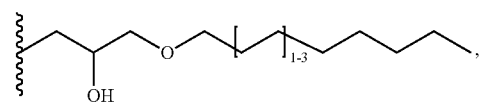

where } is the point of attachment to the small molecule amine.

Those skilled in the art will appreciate that the organic moiety can also be derived from fatty acids or fatty alcohols that are saturated or mono-, or poly-unsaturated. Such fatty acids include, for example, palmitoleic acid, sapienic acid, oleic acid, linoleic acid, alpha-linolenic acid, arachidonic acid, lauric acid, myristic acid, palmitic acid, or stearic acid, including mixtures thereof. Organic moieties derived from tall oil fatty acids or tallow are also included herewith as these commonly contain one or more of the aforementioned fatty acids. Suitable fatty alcohols include, for example, $C_4$ to $C_{22}$ alcohols, and preferably $C_8$ to $C_{18}$ alcohols.

In certain embodiments of the processes described herein, one or more other industrial additives can also be added. Such additives include, for example, other anti-scalants, biocides, corrosion inhibitors, or dispersants. The prior art is replete with such industrial treatment additives and these are generally known to those skilled in the art along with the parameters and conditions for their use. Furthermore, such additives can also be added in a single stage or multiple stages of the phosphoric acid production process along with the reagents described herein. It will be appreciated that the additives can be added in the same stage or different stage as the reagent, or sequentially, in reverse order, or simultaneously.

According to the methods of the invention, the reagent including the primary amine-containing polymers, or salts thereof, described herein is added to any stage (including multiple stages) of a wet process phosphoric acid production stream (e.g., one or more of the milling stage, digesting stage, filtering stage, clarifying stage, or evaporator stage). Accordingly, while it may be added at the digester stage, in certain embodiments it is more preferably added to the phosphoric acid stream going to the filters or evaporators as this is where the most prevalent scaling problems occur. In the same or other embodiments, the scale inhibiting reagent can be added to any of the piping connecting the various stages of the phosphoric acid production process. This is sometimes referred to in the field as the "interstitial piping" or "process flow pipeline".

The scale inhibiting reagents that are in liquid form (such as with water, oil and/or alcohol) may be formulated in various ways, e.g., the solid reagent may be suspended (e.g., colloidal suspension), dispersed and/or slurried in the liquid, and/or the reagent may be suspended, dispersed, slurried and/or dissolved in the liquid.

The scale inhibiting reagents described herein can be intermixed in the phosphoric acid liquor or production process in various ways, e.g., in a single stage, in multiple stages, or if various mixtures of reagent are added, then sequentially, in reverse order, simultaneously, or in various combinations thereof. For example, in one embodiment, the scale inhibiting reagent is added to diluent to form a premix, then intermixed with the phosphoric acid liquor. In another embodiment, the reagent can be added directly to the process stream. In another embodiment, the scale inhibiting reagent is formed in situ by separately inter-mixing the components of the reagent with the phosphoric acid. Accordingly, the scale inhibiting reagents described herein can either be added to the phosphoric acid production process as a single component or as individual components anywhere along the process. Various modes of addition will be found to be effective and can be adjusted using no more than routine experimental techniques.

As will be appreciated by those skilled in the art, the amount or dosage of reagent required to effectively inhibit scale (i.e., a scale inhibiting amount) will vary depending upon the particular reagent used and/or the severity of the scaling problem encountered, the species of scale-forming ions present, as well as the concentration or saturation of scale-forming ions.

As a general rule, the dosage is based on active polymer reagent based on the weight of phosphoric acid solution, and can range from between 0.5 g/ton to 5000 g/ton of phosphoric acid. In certain embodiments, the dosage of active polymer can be from 0.5 g/ton to 1000 g/ton of phosphoric acid solution, and preferably from 0.5 g/ton to 500 g/ton of phosphoric acid solution. In some embodiments, the dosage of active reagent can be at least 100 g/ton of phosphoric acid solution, whereas in other embodiments it can be at least 500 g/ton of phosphoric acid solution. Those skilled in the art will recognize that the contemplated dosage range includes the lower dose value and higher dose value, as well as any specific dose value there between (e.g., 0.5 g/ton, 0.6 g/ton, 0.7 g/ton, et seq. up to and including 5000 g/ton of phosphoric acid). Each dosage point from 0.5 g/ton to 5000 g/ton is specifically contemplated by the invention as if specifically recited herein.

The reagents described herein are effective against various species of scale-forming ions most commonly found in the wet process phosphoric acid production stream. Accordingly, in certain embodiments, the reagent is useful in treating or inhibiting scale that includes, but are not limited to, at least one species of scale-forming ion chosen from $Na_2SiF_6$; $K_2SiF_6$; $CaSO_4+2\ H_2O$; $CaSO_4+\frac{1}{2}\ H_2O$; $CaSO_4$; $MgSiF_6+6\ H_2O$; $Ca_3(PO_4)_2$; $CaHPO_4$; $Si_2F_6$; $CaSiF_6+2\ H_2O$; $CaF_2$; $MgF_2$; $Mg_{0.8}Al_{1.5}F_6+X\ H_2O$, wherein X is an integer ranging from 2 to 10; $MgH_2P_6O_7$; $Al(PO_3)_3$; $NaK_2AlF_6$; $Ca_3(AlF_6)_2+4\ H_2O$; $MgNaAlF_6+2\ H_2O$; or $Ca_4SO_4AlSiF_{13}+10\ H_2O$. As will be appreciated by those skilled in the art, the typical phosphoric acid process stream contains numerous species of scale-forming ions, which gives rise to the difficulty in inhibiting scale formation and/or deposition in the first place.

In accordance with the above, the invention includes at least the following embodiments:

Embodiment 1

A process for inhibiting scale produced during wet process phosphoric acid production, the process comprising:

adding a scale-inhibiting amount of a reagent comprising a primary amine-containing polymer, or salt thereof, to at least one stage of a wet process phosphoric acid production process, wherein said primary amine-containing polymer comprises an A mer according to Formula (I):

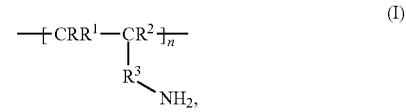

where
R is H, $C_1$-$C_6$ alkyl, $C_2$-$C_6$ alkenyl, halide, or carboxyl;
$R^1$ is H, $C_1$-$C_6$ alkyl, or $C_2$-$C_6$ alkenyl;
$R^2$ is H or an A mer according to Formula (I);
$R^3$ is chosen from a direct bond or a $C_1$-$C_{12}$ alkyl, $C_2$-$C_{12}$ alkenyl, or a $C_6$-$C_{12}$ aryl group; and
n is an integer chosen to provide a weight average molecular weight of the primary amine-containing polymer of at least 300 Daltons, and wherein the percentage of primary amine in the polymer is from 30 mole % to 100 mole % based on the total percentage of mer units in the polymer.

Embodiment 2

A process according to embodiment 1, wherein R and $R^1$ are H, and $R^3$ is a direct bond.

Embodiment 3

A process according to embodiment 1 or embodiment 2, wherein the primary amine-containing polymer is a polyvinylamine homopolymer, or a salt thereof.

Embodiment 4

A process according to embodiment 1, wherein R and $R^1$ are H, and $R^3$ is $CH_2$.

Embodiment 5

A process according to embodiment 1 or embodiment 4, wherein the primary amine-containing polymer is a polyallylamine homopolymer, or a salt thereof.

Embodiment 6

A process according to embodiment 5, wherein the polyallylamine homopolymer salt is polyallylamine-hydrochloride.

Embodiment 7

A process according to any one of embodiments 1, 2, or 4, wherein the primary amine-containing polymer further comprises a B mer.

Embodiment 8

A process according to embodiment 7, wherein $R^3$ of said A mer is a direct bond, said B mer unit comprises a compound according to Formula (II):

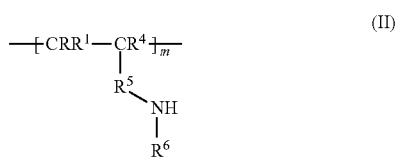

wherein
R and $R^1$ are as defined for the A mer according to Formula (I);
$R^4$ is chosen from H or $C_1$-$C_4$ alkyl;
$R^5$ is a direct bond or a $C_1$-$C_{12}$ alkyl; $C_2$-$C_{12}$ alkenyl, or a $C_6$-$C_{12}$ aryl group;
$R^6$ is a $C_1$-$C_{22}$ alkyl, $C_2$-$C_{22}$ alkenyl, or $C_6$-$C_{22}$ aryl group, which group is optionally substituted at one or more substitutable position
n is chosen from 30 mole % to 99 mole % based on the total percentage of mer units in the polymer; and
m is chosen from 1 mole % to 70 mole % based on the total percentage of mer units in the polymer.

Embodiment 9

A process according to embodiment 8, wherein the B mer unit according to Formula (II) is

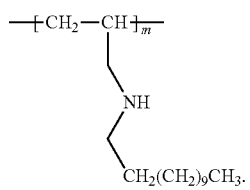

Embodiment 10

A process according to embodiment 7, wherein the B mer is derived from a monomer selected from the group consisting of diallylamine, diallyldimethylammonium chloride; acrylamide; N-methylolacrylamide; N-($C_1$ to $C_{22}$)alkyl acrylamide, N,N-di-($C_1$ to $C_{22}$)alkyl acrylamide, hydroxy alkyl(meth)acrylamide, N-vinylformamide; N-($C_1$ to $C_{22}$) alkyl-N-vinylformamide, N-vinylacetamide, N-($C_1$ to $C_{22}$) alkyl-N-vinylacetamide, N-vinyl propionamide, N-($C_1$ to $C_{22}$)alkyl-N-vinyl propionamide, (meth)acrylic acid; the esters, nitriles, and amides of (meth)acrylic acid; vinyl acetate, vinyl propionate, vinyl alcohol, ($C_1$ to $C_{22}$)alkyl vinyl ethers, vinylpyrrolidone; polyetheramine; and copolymers thereof.

Embodiment 11

A process according to embodiment 7 or embodiment 10, wherein the B mer is N-vinylformamide, and the primary amine-containing polymer is a poly(vinylamine-co-vinylformamide) copolymer, or a salt thereof.

Embodiment 12

A process according to embodiment 7 or embodiment 10, wherein the B mer is N-vinylacetamide and the primary amine containing polymer is a poly(vinylamine-co-vinylacetamide), or a salt thereof.

Embodiment 13

A process according to embodiment 7 or embodiment 10, wherein the primary amine-containing polymer includes at least two B mer units.

Embodiment 14

A process according to embodiment 13, wherein the primary amine-containing polymer is a poly(vinylamine-co-vinylformamide-co-diallyldimethylammonium chloride) terpolymer, or a salt thereof.

Embodiment 15

A process according to embodiment 13, wherein said B mer units are N-($C_6$ to $C_{22}$)alkyl acrylamide and vinylformamide.

Embodiment 16

A process according to embodiment 15, wherein the primary amine-containing polymer is a poly(vinylamine-co-vinylformamide-co-N-t-octylacrylamide) terpolymer, or a salt thereof.

Embodiment 17

A process according to any one of embodiments 1 to 16, wherein the primary amine-containing polymer is branched.

Embodiment 18

A process according to any one of embodiments 1 to 17, wherein the weight average molecular weight of the primary amine-containing polymer is from 300 Daltons to 300,000 Daltons.

Embodiment 19

A process according to any one of embodiments 1, 2, or 4, wherein the percentage of primary amine in the polymer is from 45 mole % to 100 mole % based on the total percentage of mer units in the polymer.

Embodiment 20

A process according to embodiment 19, wherein the percentage of primary amine in the polymer is from 55 mole % to 100 mole % based on the total percentage of mer units in the polymer.

Embodiment 21

A process according to any one of embodiments 7 to 18, wherein the percentage of primary amine in the polymer is from 45 mole % to 99 mole % based on the total percentage of mer units in the polymer.

Embodiment 22

A process according to embodiment 21, wherein the ratio of primary amine in the polymer is from 60 mole % to 99 mole %.

Embodiment 23

A process for inhibiting scale produced during wet process phosphoric acid production comprising adding a scale inhibiting amount of a reagent comprising a primary amine-containing polymer to at least one stage of a wet process phosphoric acid production process, wherein said primary amine-containing polymer includes one or more organic moieties that reduce the polymer's solubility in an aqueous environment as compared to its native form, thereby reducing or preventing scale in the wet process phosphoric acid production process.

Embodiment 24

A process according to embodiment 23, wherein the primary amine-containing polymer is a branched polyethyleneimine.

Embodiment 25

A process according to embodiment 24, wherein the polyethyleneimine has a number average molecular weight from 300 Da to 300,000 Da.

Embodiment 26

A process according to embodiment 25, wherein the number average molecular weight is from 300 Da to 100,000 Da.

Embodiment 27

A process according to any one of embodiments 23 to 26 wherein the organic moiety is present at one or more substitutable positions of the small molecule amine and is chosen from a $C_1$-$C_{22}$ hydrocarbyl optionally substituted with one or more substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy and heteroaryloxy.

Embodiment 28

A process according to embodiment 27, wherein said moiety is independently chosen in each instance from a C8-C22 hydrocarbyl.

Embodiment 29

A process according to embodiment 28, wherein said moiety is octyl.

Embodiment 30

A process according to embodiment 28, wherein said moiety is dodecyl.

Embodiment 31

A process according to any one of embodiments 23 to 27, wherein said moiety is a linear or branched C8-C12-oxybutan-2-ol.

Embodiment 32

A process according to any one of embodiments 23 to 27, wherein said moiety is a C12-C18 tallow alkyl.

Embodiment 33

A process according to any one of embodiments 23 to 27, wherein said moiety is derived from a tall oil fatty acid.

Embodiment 34

A process according to any one of embodiments 1 to 33, wherein the scale produced contains at least one species of scale-forming ion selected from the group consisting of $Na_2SiF_6$; $K_2SiF_6$; $CaSO_4+2$ $H_2O$; $CaSO_4+\frac{1}{2}$ $H_2O$; $CaSO_4$; $MgSiF_6+6$ $H_2O$; $Ca_3(PO_4)_2$; $CaHPO_4$; $Si_2F_6$; $CaSiF_6+2$ $H_2O$; $CaF_2$; $MgF_2$; $Mg_{0.8}Al_{1.5}F_6+X$ $H_2O$, wherein X is an integer ranging from 2 to 10; $MgH_2P_6O_7$; $Al(PO_3)_3$; $NaK_2AlF_6$; $Ca_3(AlF_6)_2+4$ $H_2O$; $MgNaAlF_6+2$ $H_2O$; and $Ca_4SO_4AlSiF_{13}+10$ $H_2O$.

Embodiment 35

A process according to any one of embodiments 1 to 33, wherein the reagent is added to any of the interstitial piping of the phosphoric acid production plant and/or to one or more stages of the phosphoric acid production process selected from the group consisting of the milling stage; the digesting stage; the filtering stage; the evaporation stage; and the clarifying stage.

Embodiment 36

A process according to any one of embodiments 1 to 35, wherein the scale-inhibiting amount of reagent added to the wet process phosphoric acid production process is from 0.5 g per ton to 5000 g per ton of phosphoric acid.

Embodiment 37

A process according to embodiment 36, wherein the scale-inhibiting amount of reagent added to the wet process phosphoric acid production process is from 0.5 g per ton to 1000 g per ton of phosphoric acid.

Embodiment 38

A process according to embodiment 37, wherein the scale-inhibiting amount of reagent added to the wet process phosphoric acid production process is from 0.5 g per ton to 500 g per ton of phosphoric acid.

Embodiment 39

A process according to embodiment 35, wherein the amount of reagent added is at least 100 g per ton of phosphoric acid.

Embodiment 40

A process according to embodiment 35, wherein the amount of reagent added is at least 500 g per ton of phosphoric acid.

The following examples are provided to assist one skilled in the art to further understand certain embodiments of the present invention. These examples are intended for illustration purposes should not be construed as limiting the scope of the present invention.

Example 1—Synthesis of poly(allylamine hydrochloride) (Poly(AAm-HCl)) and poly(allylamine) (Poly(AAm))

The general synthesis pathway for Poly(AAm-HCl) and Poly(AAm) is provided below:

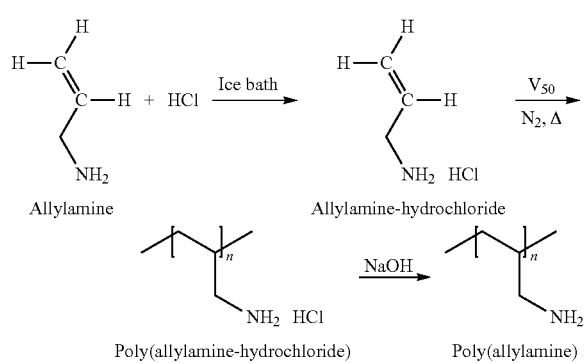

To 58.3 g of allylamine monomer (98 wt %) 40 g of water is mixed. The allylamine aqueous solution is pre-cooled with ice bath for half an hour. The same molar amount of hydrochloric acid (98.6 g, 37 wt %) is added to the allylamine monomer solution (kept in ice bath) under agitation with the temperature controlled to be below 25° C. The allylamine-hydrochloride solution is then transferred into a 500 ml jacketed reactor. 2.7 g of the initiator 2,2'-azobis(2-methylpropionamidine)dihydrochloride (V50) is first dissolved in 16 g of water and the V50 aqueous solution is then added to the reactor and mixed well. The mixture is purged with nitrogen for 30 minutes under agitation and then placed into a 60° C. water bath. The mixture is allowed to polymerize for 15 hours at 60° C. under nitrogen (or longer, i.e., overnight). An additional amount of initiator solution (1.4 g of V50 dissolved in 8.6 g of water) is added to convert any unreacted monomer. The mixture is allowed to polymerize for another 15 hours at 60° C. under nitrogen (or longer, i.e., overnight), and then the product solution is cooled to room temperature. A portion of the polymer product is precipitated in acetone, and vacuum dried at 40° C. for 16 hours to obtain dried Poly(AAm-HCl). The composition is confirmed by NMR, and the weight average molecular weight (Mw) is determined to be 4,300 Daltons with a polydispersity (PDI) of 1.6 (characterized by Gel Permeation Chromatography (GPC)). The remaining portion of polymer product is neutralized by addition of NaOH (50 wt %) to pH 8. This polymer product is then precipitated in acetone as above, and vacuum dried at 40° C. for 16 hours to obtain dried Poly(AAm). The composition is confirmed by NMR, and the weight averaged molecular weight is determined by GPC to be 7,300 Daltons with a PDI of 3.9. The weight averaged molecular weight of these polymers as determined by GPC are listed in Table 1.

Due to the autoinhibition nature of allylamine monomer, the polymerization process of allylamine-hydrochloride suffers severe degradative chain transfer problem and there is a large amount of unreacted monomer (as much as 19%) and oligomers in the polymerization product. Soxhlet extraction technique according to *Principles of Polymerization* 4th Ed. by George Odian (2004) (using acetone and methanol) is used to separate the unreacted monomer and oligomers from the targeted Poly(AAm-HCl). The weight averaged molecular weight of these separated compounds as determined by GPC are listed in Table 2.

Example 2—Synthesis of Poly(vinylamine-co-vinylformamide) (Poly(VAm-co-VFA)) Copolymers of Various Chain Length The general synthesis pathway of P(VAm-co-VFA) copolymers is provided below:

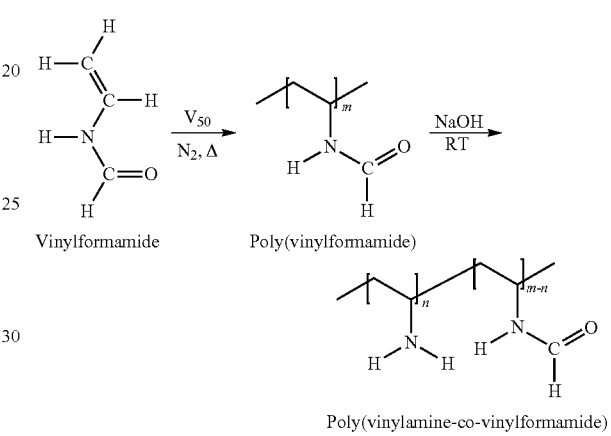

72.5 g of vinylformamide monomer (VFA, 98 wt %), 1.4 g of the initiator 2,2'-azobis(2-methylpropionamidine)dihydrochloride (V50), and 280 g of water are added into a 500 ml jacketed reactor, and mixed well. The solution is purged with nitrogen for 30 minutes under agitation, and then the reactor is placed into a 60° C. water bath and allowed to polymerize for 16 hours. The product solution is cooled to room temperature and precipitated in acetone and vacuum dried for 16 hours at 40° C. to obtain poly(vinylformamide) (Poly(VFA)). The composition of prepared Poly(VFA) is confirmed by NMR, and the weight averaged molecular weight is determined to be 175 kDa with a PDI of 1.3 as characterized by GPC.

3 g of Poly(VFA) as prepared above is dissolved in 29 g of water. 3.4 g of 50% NaOH is added to the dissolved Poly(VFA) solution, and a hydrolysis reaction is conducted at room temperature for 120 hours. The hydrolyzed polymer product is precipitated in acetone, and then vacuum dried at 40° C. for 16 hours to obtain Poly(VAm-co-VFA). The hydrolyzed (co)polymer products are characterized with NMR and GPC. NMR results indicate that the hydrolyzed product contains 92 mol % of vinylamine and 8 mol % of vinylformamide. GPC results indicate that the weight average molecular weight of the hydrolyzed product is 134 kDa with a PDI of 2.1. Similar hydrolysis reactions are conducted with less NaOH added to reduce the molar ratio of vinylamine in the final hydrolyzed products. NMR and GPC results (ranging from 70 kDa to 152 kDa) for these final products are listed in Table 3.

The molecular weights (i.e., chain lengths) of hydrolyzed Poly(VAm-co-VFA) copolymers are determined by that of the parent Poly(VFA). Therefore, by tuning the molecular weight of parent Poly(VFA), Poly(VAm-co-VFA) copolymers with controlled molecular weights can be prepared. By tuning the reaction temperature, initiator concentration, monomer concentration, and chain transfer reagents, the weight average molecular weight (Mw) of synthesized Poly (VFA) can be controlled to be about 36 kDa. For example, 50.8 g of vinylformamide monomer (VFA, 98 wt %), 3.8 g of the initiator 2,2'-azobis(2-methylpropionamidine)dihydrochloride (V50), 0.5 g of sodium hypophosphite hydrate, and 445 g of water are added into a 1000 ml jacketed reactor. The mixed solution is purged with nitrogen for 30 minutes under agitation. Then the reactor is placed into a water bath at 80° C. and kept at this temperature for polymerization for 16 hours. After polymerization, the product solution is cooled to room temperature. The polymer product is precipitated in acetone and vacuum dried for 16 hours at 40° C. to obtain poly(vinylformamide) (Poly(VFA)). The composition of prepared Poly(VFA) is confirmed by NMR, and the weight averaged molecular weight (Mw) is 36 kDa with a PDI of 2.4 (as characterized by GPC). The controlled hydrolysis of prepared Poly(VFA) follows the same procedure as discussed above. The hydrolyzed (co)polymer products are characterized with NMR and the results are listed in Table 4.

Poly(VFA) of lower weight average molecular weight can also be prepared. For example, 100.5 g of vinylformamide monomer (VFA, 98 wt %) is added to a 500 ml jacketed reactor. The monomer is cooled to 1° C. under nitrogen using ice-water cooling bath for half an hour. 0.99 g of boron trifluoride diethyl etherate is added to the monomer dropwise. The reactor is kept in ice-water cooling bath for polymerization for 16 hours. Then the bath temperature is increased to 25° C. and kept at 25° C. for polymerization for 0.5 hour. Then the bath temperature is further increased to 50° C. and kept at 25° C. for polymerization for 1 hour. Next, 100 g of water is added to the reactor to dissolve the solid polymer product. The polymer product is precipitated in acetone and vacuum dried for 16 hours at 40° C. to obtain poly(vinylformamide) (Poly(VFA)). The composition of prepared Poly(VFA) is confirmed by NMR, and the weight averaged molecular weight (Mw) is too low to be determined by GPC (i.e., <1 kDa). The controlled hydrolysis of prepared Poly(VFA) follows the same procedure as presented above. The hydrolyzed (co)polymer products are characterized with NMR and the results are listed in Table 5.

Example 3—Synthesis of Poly(vinylamine-co-vinylformamide-co-diallyldimethylammonium chloride) (Poly(VAm-co-VFA-co-DADMAC))

The general synthesis pathway of Poly(VAm-co-VFA-co-DADMAC) copolymers is provided below:

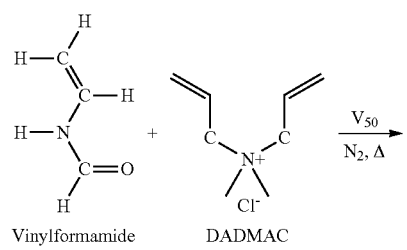

Vinylformamide    DADMAC

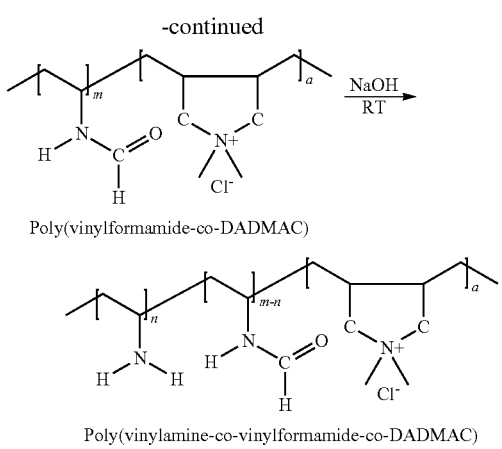

Poly(vinylformamide-co-DADMAC)

Poly(vinylamine-co-vinylformamide-co-DADMAC)

Synthesis of poly(vinylamine-co-vinylformamide-co-diallyldimethylammonium chloride) is performed according to the protocol of Example 2, except that diallyldimethylammonium chloride (DADMAC) monomer is also added to the reactor with vinylformamide monomer. For example, 36.3 g of vinylformamide monomer (VFA, 98 wt %), 1.4 g of the initiator 2,2'-azobis(2-methylpropionamidine)dihydrochloride (V50), 124.4 g DADMAC (65 wt %), and 420 g of water are added into a 1000 ml jacketed reactor. In another example, 58.0 g of vinylformamide monomer (VFA, 98 wt %), 1.4 g of the initiator 2,2'-azobis(2-methylpropionamidine)dihydrochloride (V50), 49.7 g DADMAC (65 wt %), and 340 g of water are added into a 1000 ml jacketed reactor. The polymerization and hydrolysis procedures for both reactions are performed according to the protocol in Example 2. The synthesized (co)polymer products are characterized with NMR and GPC and the results are listed in Table 6.

Example 4—Synthesis of Poly(vinylamine-co-vinylformamide-co-N-t-octylacrylamide) (Poly(VAm-co-VFA-co-OAA))

The general synthesis pathway of Poly(VAm-co-VFA-co-OAA) copolymers is provided below:

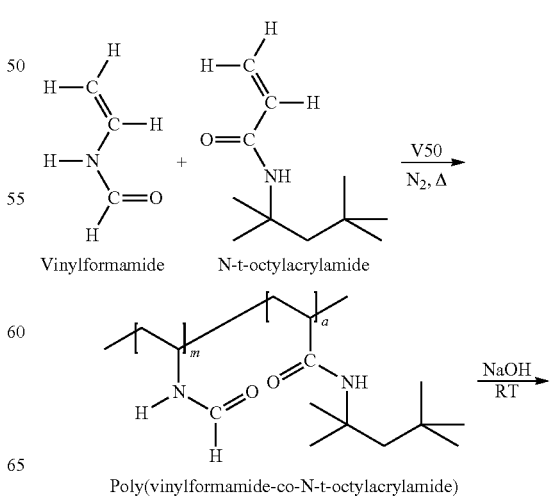

Vinylformamide    N-t-octylacrylamide

Poly(vinylformamide-co-N-t-octylacrylamide)

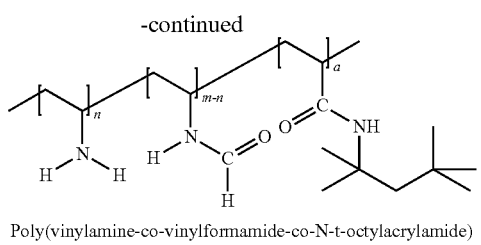

Poly(vinylamine-co-vinylformamide-co-N-t-octylacrylamide)

Copolymers are prepared by adding B monomer units having alkyl chain sidegroups to the A precursor monomer (e.g., vinylformamide) during polymerization. Synthesis of Poly(VAm-co-VFA-co-OAA) copolymers is performed according to the protocol of Example 2, except that N-t-octylacrylamide monomer(OAA) is also added to the reactor with vinylformamide monomer. Isoproyl alcohol (IPA)-H2O co-solvent was chosen to dissolve the two different monomers to prepare a homogeneous solution. For example, 34.5 g of vinylformamide monomer (VFA, 98 wt %)), 2.7 g of the initiator 2,2'-azobis(2-methylpropionamidine)dihydrochloride (V50), 4.7 g of OAA (99 wt %), 170 g of IPA, and 170 g of water are added into a 500 ml jacketed reactor. The polymerization and hydrolysis procedures are performed according to the protocol in Example 2. The synthesized (co)polymer products are characterized with NMR and GPC and the results are listed in Table 7.

Example 5—Synthesis of Dodecyl Modified poly(allylamine) Copolymer

The general synthesis pathway of dodecyl modified poly(allylamine) copolymer is provided below:

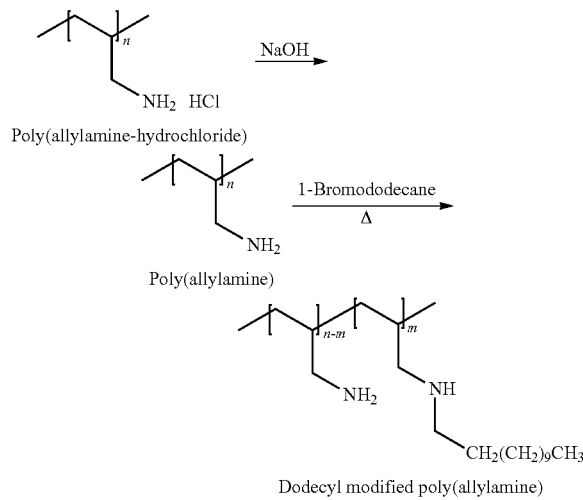

Dodecyl modified poly(allylamine)

Poly(allylamine-HCl) (0.493 g) (Mw=6050, as prepared in Example 1 after soxhlet extraction with acetone and methanol) is mixed with NaOH (0.232 g) in methanol at room temperature. The mixture is stirred at room temperature for 18 h, followed by the addition of 1-bromododecane (0.0657 g). The mixture is stirred at 50° C. for 48 h before evaporation of all solvents. The synthesized (co)polymer products are confirmed by NMR analysis.

Example 6—Evaluation of the Relative Performance of Anti-Scaling Reagents

The performance of primary amine-containing polymers useful as reagents for inhibiting scale in wet process phosphoric acid production is measured via a turbidity test (based on supersaturation-precipitation process). This method is useful to evaluate whether the primary amine-containing polymer can control the precipitation of calcium sulfate and fluorosilicate type scales from process phosphoric acid solutions that have been supersaturated via evaporation and cooling. The general procedure for the test is outlined below, which is based on the generation of 16 individual samples. Those skilled in the art will appreciate that different starting and ending volumes may be used to generate greater or fewer samples. The acid may also be concentrated to a greater or lesser degree.

In a ventilated hood, 600 g of 28 wt % process phosphoric acid ($P_2O_5$) is added to a 1 L Teflon beaker. The total weight of the acid and beaker is recorded. The acid is reduced in weight to approx. 400 g (i.e., concentrated to approx. 42 wt % $P_2O_5$) by heating on a hot plate (Thermo Scientific Cimarec) set at 120° C. with moderate stirring (set at 6). Concentration of the phosphoric acid to this level typically occurs after 20-24 hours and can be performed overnight.

For 100 ppm dosage of reagent, 0.2 g of 1 wt % (based on active dry component) solutions of the reagents of interest are added to 4 oz. glass vials using an analytical balance. 0.2 g of water is added to the control vials. 19.8 g of hot concentrated phosphoric acid is added to each vial using a plastic syringe with a 0.2 micron syringe filter. The vials are shaken to form a homogenous mixture and left to sit at room temperature, without agitation, for 6-24 hours.

Turbidity is measured with a HACH® 2100Q portable turbidimeter (nephelometer), or other equivalent, which is calibrated and used according to directions in the instruction manual. Each glass vial is shaken gently to loosen attached scales from sidewall and bottom of vials. The contents of the vial are emptied into the turbidity meter test cell, and the measurement is taken after 10-30 seconds. The test cell is flipped back and forth 5 times and the measurement is taken again after 10-30 seconds. The testing cell is emptied and rinsed with deionized water and dried with an air or nitrogen stream and the remaining samples are measured in the same way. Units of measurement are given as Nephelometric Turbidity Units (NTUs), with lower NTUs representing less particles suspended in the sample solution. HACH® 2100Q portable turbidimeter has an upper limit reading of 1000 NTUs. For purposes of the invention a lower NTU is desirable and indicates less scale particles and is predictive of the reagent being more effective as a scale inhibitor for wet process phosphoric acid productions streams.

Example 7—Evaluation of Poly(allylamine hydrochloride) (Poly(AAm-HCl)) and Poly(allylamine) (Poly(AA))

Poly(AAm-HCl) is synthesized using free radical polymerization of allylamine-hydrochloride as indicated in Example 1. Then Poly(AAm) is prepared by neutralizing the hydrochloride group with NaOH, again according to Example 1. The performance of synthesized Poly(AAm-HCl) and Poly(AAm) as phosphoric acid anti-scalants is measured in the turbidity test as indicated by Example 6. Results are shown in Table 1.

TABLE 1

| Sample | Mn (Da) | Mw (Da) | PDI | Turbidity @ 100 ppm (NTU) |
|---|---|---|---|---|
| Control (0.2 g H2O) | — | — | — | 360 |
| Poly(allylamine-HCl) | 2,700 | 4,300 | 1.6 | 190 |
| Poly(allylamine) | 1,900 | 7,300 | 3.9 | 160 |

Compared with the control sample, both primary amine-containing polymers effectively inhibit (i.e., reduce or prevent) the amount of scale generated during the turbidity testing process. P(AAm) shows slightly better performance than P(AAm-HCl).

Example 8—Evaluation of Different Fractions of poly(allylamine hydrochloride) (Poly(AAm-HCl)) from Soxhlet Extraction Poly(AAm-HCl) is synthesized using free radical polymerization of allylamine-hydrochloride as indicated in Example 1. The large amount of unreacted monomer and oligomers in the polymerization product is separated from the targeted Poly(AAm-HCl) using Soxhlet extraction technique (as in Example 1) and the fractions are evaluated for use as phosphoric acid scale inhibitors using the turbidity test of Example 6. Results are shown in Table 2.

TABLE 2

| Sample | Mw (Da) | Turbidity @ 100 ppm (NTU) |
|---|---|---|
| Control (0.2 g H2O) | — | 820 |
| Poly(allylamine-HCl) (acetone extract) | Too low to be detected in GPC | 790 |
| Poly(allylamine-HCl) (methanol extract) | <1000 | 420 |
| Poly(allylamine-HCl) (leftover) | 6050 | 90 |

The results indicate that there is a correlation between the size of polymer product and the scale control capability for phosphoric acid. Accordingly, primary amine-containing polymers need to be over a certain molecular weight (chain length) to be effective.

Example 9—Evaluation of Poly(vinylamine-co-vinylformamide) (Poly(VAm-co-VFA)) (Co)Polymers Synthesized from Poly(VFA) of 175 kD Poly(VAm-co-VFA) copolymers ranging from 70 kD to 152 kD are made according to Example 2. The performance of synthesized Poly(VAm-co-VFA) as phosphoric acid anti-scalants is measured in the turbidity test as indicated by Example 6. Results are shown in Table 3, where the percentage listed in the Sample column refers to the mole % of the primary amine (vinylamine).

TABLE 3

| Sample | Mw (Da) | Vinylformamide (mole %) | Vinylamine (mole %) | Turbidity @ 100 ppm (NTU) |
|---|---|---|---|---|
| Control (0.2 g H2O) | — | — | — | 780 |
| Poly(VFA) | 175,000 | 100 | 0 | 760 |
| Poly(VAm-co-VFA) - 31% | 152,000 | 69 | 31 | ≥1000 |
| Poly(VAm-co-VFA) - 51% | 147,000 | 49 | 51 | 530 |
| Poly(VAm-co-VFA) - 67% | 138,000 | 33 | 67 | 180 |
| Poly(VAm-co-VFA) - 76% | 70,000 | 24 | 76 | 33 |
| Poly(VAm-co-VFA) - 79% | 135,000 | 21 | 79 | 36 |
| Poly(VAm-co-VFA) - 92% | 134,000 | 8 | 92 | 320 |

The results indicate that those polymers containing a certain percentage of primary amines are more effective at inhibiting scale generated during the testing process than either control samples (no primary amine-containing polymers) or samples containing a low percentage of primary amine-containing polymers. Thus, a correlation can be said to exist between the performance of the reagent polymer in inhibiting scale and the percentage of primary amines in the synthesized polymers.

Example 10—Evaluation of Poly(vinylamine-co-vinylformamide) (Poly(VAm-co-VFA)) Copolymers Synthesized from Poly(VFA) of 36 kD Poly(VAm-co-VFA) copolymers synthesized from Poly(VFA) of 36 kD are made according to Example 2. The performance of synthesized Poly(VAm-co-VFA) as phosphoric acid anti-scalants is measured in the turbidity test according to Example 6. Results are shown in Table 4. Again, the percentage listed in the Sample column refers to the mole % of the primary amine (vinylamine).

TABLE 4

| Sample | Mw (Da) | Vinylamine (mole %) | Turbidity @ 100 ppm (NTU) |
|---|---|---|---|
| Control (0.2 g H2O) | — | — | 820 |
| Poly(VFA) | 36,000 | 1 | 620 |
| Poly(VAm-co-VFA) - 13% | N/A | 13 | ≥1000 |
| Poly(VAm-co-VFA) - 44% | N/A | 44 | ≥1000 |
| Poly(VAm-co-VFA) - 62% | N/A | 62 | 290 |
| Poly(VAm-co-VFA) - 82% | N/A | 82 | 220 |
| Poly(VAm-co-VFA) - 94% | N/A | 94 | 520 |

The results again indicate that those polymers containing a certain percentage of primary amines are more effective at inhibiting scale generated during the testing process than either control samples (no primary amine-containing polymers) or samples containing a low percentage of primary amine-containing polymers, even at medium molecular weight. Thus, the correlation between the performance of the reagent polymer in inhibiting scale and the percentage of primary amines in the synthesized polymers holds regardless of molecular weight.

Example 11—Evaluation of Poly(vinylamine-co-vinylformamide) (Poly(VAm-co-VFA)) Copolymers Synthesized from Poly(VFA) of <1 kD Poly(VAm-co-VFA) copolymers synthesized from Poly(VFA) of <1 kD are made according to Example 2. The performance of synthesized Poly(VAm-co-VFA) as phosphoric acid anti-scalants is measured in the turbidity test according to Example 6. Results are shown in Table 5. Again, the percentage listed in the Sample column refers to the mole % of the primary amine (vinylamine).

TABLE 5

| Sample | Mw (Da) | Vinylamine (mole %) | Turbidity @ 100 ppm (NTU) |
|---|---|---|---|
| Control (0.2 g H2O) | — | — | >1000 |
| Poly(VFA) | <1k | 0 | >1000 |
| Poly(VAm-co-VFA) - 26% | N/A | 26 | >1000 |
| Poly(VAm-co-VFA) - 44% | N/A | 44 | >1000 |
| Poly(VAm-co-VFA) - 63% | N/A | 63 | >1000 |
| Poly(VAm-co-VFA) - 87% | N/A | 87 | 514 |
| Poly(VAm-co-VFA) - 97% | N/A | 97 | 19 |

Example 12—Evaluation of Poly(vinylamine-co-vinylformamide-co-diallyldimethylammonium chloride) (Poly(VAm-co-VFA-co-DADMAC))

Poly(VAm-co-VFA-co-DADMAC) copolymers are made according to Example 3. The performance of synthesized Poly(VAm-co-VFA-co-DADMAC) as phosphoric acid anti-scalants is measured in the turbidity test according to Example 6. Results are shown in Table 6. The numbers provided in the Sample column refer to the mole % of each of the respective monomers.

TABLE 6

| Sample | Mw (Da) | Vinyl-amine (mole %) | Vinyl-formamide (mole %) | DADMAC (mole %) | Turbidity @ 100 ppm (NTU) |
|---|---|---|---|---|---|
| Control (0.2 g H2O) | — | — | — | — | 820 |
| Poly(VFA-co-DADMAC) 62-38 | 121,000 | 0 | 62 | 38 | 690 |
| Poly(VAm-co-VFA-co-DADMAC) 51-12-37 | 98,500 | 51 | 12 | 37 | 560 |
| Poly(VAm-co-VFA-co-DADMAC) 76-14-9 | N/A | 76 | 14 | 9 | 210 |
| Poly(VAm-co-VFA-co-DADMAC) 89-4-7 | N/A | 89 | 4 | 7 | 170 |

The results once again confirm that those polymers containing a certain percentage of primary amines are more effective at inhibiting scale generated during the testing process than either control samples (no primary amine-containing polymers) or samples containing a low percentage of primary amine-containing polymers.

Example 13—Evaluation of Poly(vinylamine-co-vinylformamide-co-N-t-octylacrylamide) (Poly(VAm-co-VFA-co-OAA)) Copolymers Poly(VAm-co-VFA-co-OAA) copolymers are made according to Example 4. Poly(vinylamine-co-vinylformamide) (Poly(VAm-co-VFA)) copolymer counterparts (i.e., copolymers with no alkylacrylamideside groups) were also made (according to Example 2). The performance of synthesized Poly(VAm-co-VFA-co-OAA) and Poly(VAm-co-VFA) copolymers as phosphoric acid anti-scalants is measured in the turbidity test according to Example 6. Results are shown in Table 7. The numbers provided in the Sample column refer to the mole % of each of the respective monomers based on the total percentage of mer units in the polymer.

TABLE 7

| Sample | Mw (Da) | Vinyl-formamide (mole %) | Vinyl-amine (mole %) | N-t-octyl-acrylamide (mole %) | Turbidity @ 100 ppm (NTU) |
|---|---|---|---|---|---|
| Control | — | — | — | — | 470 |
| Poly(VFA) | 24,000 | 100 | 0 | — | 506 |
| Poly(VAm-co-VFA) | N/A | 58 | 38 | — | 652 |
| Poly(VAm-co-VFA) | N/A | 36 | 59 | — | 105 |
| Poly(VAm-co-VFA) | N/A | 18 | 82 | — | 22 |
| Poly(VAm-co-VFA) | N/A | 8 | 92 | — | 20 |
| Poly(VFA-co-OAA) | N/A | 94 | 0 | 6 | 221 |
| Poly(VAm-co-VFA-co-OAA) | N/A | 60 | 35 | 5 | 283 |
| Poly(VAm-co-VFA-co-OAA) | N/A | 36 | 59 | 4 | 68 |
| Poly(VAm-co-VFA-co-OAA) | N/A | 17 | 80 | 3 | 10 |
| Poly(VAm-co-VFA-co-OAA) | N/A | 13 | 84 | 3 | 16 |

The results show that the poly(vinylamine) copolymers with additional B mer units having alkylacrylamideside groups are not only effective as scale inhibitors in phosphoric acid, but also show improved performance over their poly(vinylamine) counterparts in turbidity test, especially for those with a low mole percentage of primary amine.

Example 14—Evaluation of Modified Polyethyleneimine

Reaction products of polyethyleneimine and octyl-, decyl-glycidyl ether are created as follows: To a 100 mL round-bottomed flask charged with 13 mL acetonitrile, one equivalent of polyethyleneimine ("PEI") (MW 1,800) (commercially available as EPOMIN SP-018 from Nippon Shokubai) is added and dissolved with continuous stirring, followed by addition of 1, 2, or 3 equivalents of octyl-, decyl-glycidyl ether (MW ~172) (available as ERISYS™ GE-7 from Emerald Performance Materials) by dropper. The combined mixture is stirred and heated to reflux (80° C.) for 2 hrs. The solvent is evaporated under reduced pressure and the crude is dried under vacuum (300 mTorr) to give a clear viscous liquid.

The performance of the PEI-GE-7 reaction product as a reagent for phosphoric acid anti-scalant is measured in the turbidity test as described in Example 6, wherein various doses (from 25 ppm to 100 ppm) of each reagent is applied to a phosphoric acid liquor of 42% phosphoric acid. The results are summarized in Table 8 below.

TABLE 8

| Product | Dosage (ppm) | Turbidity (NTU) 24 hrs | Turbidity (NTU) 6 hrs |
|---|---|---|---|
| Control (no reagent) | — | >1000 | >1000 |
| PEI (EPOMIN SP-018) | 25 | >1000 | >1000 |
| PEI (EPOMIN SP-018) | 50 | >1000 | — |
| PEI (EPOMIN SP-018) | 100 | 309.5 | 278.5 |
| PEI (EPOMIN SP-018) | 400 | — | 229 |
| (PEI-GE7 1:1) | 100 | 210.5 | 129 |
| (PEI-GE7 1:2) | 25 | 211.5 | — |
| (PEI-GE7 1:2) | 50 | 234 | — |
| (PEI-GE7 1:2) | 100 | 219.5 | — |
| (PEI-GE7 1:3) | 25 | — | 92 |
| (PEI-GE7 1:3) | 100 | — | 84 |
| (PEI-GE7 1:3) | 400 | — | 80 |

The results show that the modified polyethyleneimine polymers are not only effective as scale inhibitors in phosphoric acid, but that such modification also provides improved performance over the native polymer in the turbidity test. Thus, polyethyleneimine polymers when modified as described herein provide enhanced performance over their native counterparts.

Thus, taken together, these results indicate that various primary amine-containing polymers, as well as various copolymeric versions thereof containing one or more substituent groups, can be highly effective reagents useful for reducing and/or preventing scale formation during wet process phosphoric acid production, and that such primary amine-containing polymers of a threshold molecular weight (i.e., chain length) and a threshold amount of a primary amine functional group can be said to be one of the key components for scale control capability for phosphoric acid generated by the wet process.

Various patent and/or scientific literature references have been referred to throughout this application. The disclosures of these publications in their entireties are hereby incorporated by reference as if written herein. In view of the above description and the examples, one of ordinary skill in the art will be able to practice the invention as claimed without undue experimentation.

Although the foregoing description has shown, described, and pointed out the fundamental novel features of certain embodiments of the present invention, it will be understood that various omissions, substitutions, and changes in the form of the detail of the invention as described may be made by those skilled in the art, without departing from the scope of the present teachings. Consequently, the scope of the present invention should not be limited to the foregoing description or discussion, but should be defined by the appended claims.

We claim:

1. A process for inhibiting scale produced during wet process phosphoric acid production, the process comprising: adding a scale-inhibiting amount of a reagent comprising a primary amine-containing polymer, or salt thereof, to at least one stage of a wet process phosphoric acid production process,
wherein said primary amine-containing polymer comprises an A mer according to Formula (I):

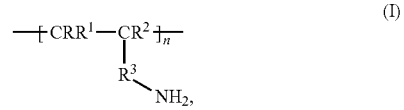

(I)

where
R is H, $C_1$-$C_6$ alkyl, $C_2$-$C_6$ alkenyl, halide, or carboxyl;
$R^1$ is H, $C_1$-$C_6$ alkyl, or $C_2$-$C_6$ alkenyl;
$R^2$ is H or an A mer according to Formula (I);
$R^3$ is chosen from a direct bond or a $C_1$-$C_{12}$ alkyl, $C_2$-$C_{12}$ alkenyl, or a $C_6$-$C_{12}$ aryl group; and
n is an integer chosen to provide a weight average molecular weight of the primary amine-containing polymer of at least 300 Daltons, and
wherein the percentage of primary amine in the polymer is from 30 mole % to 100 mole % based on the total percentage of mer units in the polymer.

2. A process according to claim 1, wherein R and $R^1$ are H, and $R^3$ is a direct bond.

3. A process according to claim 1, wherein the primary amine-containing polymer is a polyvinylamine homopolymer, or a salt thereof.

4. A process according to claim 1, wherein R and $R^1$ are H, and $R^3$ is $CH_2$.

5. A process according to claim 1, wherein the primary amine-containing polymer is a polyallylamine homopolymer, or a salt thereof.

6. A process according to claim 5, wherein the polyallylamine homopolymer salt is polyallylamine-hydrochloride.

7. A process according to claim 1, wherein the primary amine-containing polymer further comprises a B mer.

8. A process according to claim 7, wherein $R^3$ of said A mer is a direct bond, said B mer unit comprises a compound according to Formula (II):

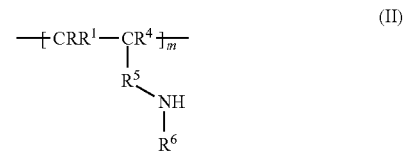

(II)

wherein
R and $R^1$ are as defined for the A mer according to Formula (I);
$R^4$ is chosen from H or $C_1$-$C_4$ alkyl;
$R^5$ is a direct bond or a $C_1$-$C_{12}$ alkyl; $C_2$-$C_{12}$ alkenyl, or a $C_6$-$C_{12}$ aryl group;
$R^6$ is a $C_1$-$C_{22}$ alkyl, $C_2$-$C_{22}$ alkenyl, or $C_6$-$C_{22}$ aryl group, which group is optionally substituted at one or more substitutable position
n is chosen from 30 mole % to 99 mole % based on the total percentage of mer units in the polymer; and
m is chosen from 1 mole % to 70 mole % based on the total percentage of mer units in the polymer.

9. A process according to claim 8, wherein the B mer unit according to Formula (II) is

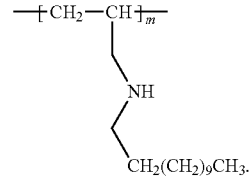

10. A process according to claim 7, wherein the B mer is derived from a monomer selected from the group consisting of diallylamine, diallyldimethylammonium chloride; acrylamide; N-methylolacrylamide; N-($C_1$ to $C_{22}$)alkyl acrylamide, N,N-di-($C_1$ to $C_{22}$)alkyl acrylamide, hydroxy alkyl (meth)acrylamide, N-vinylformamide; N-($C_1$ to $C_{22}$)alkyl-N-vinylformamide, N-vinylacetamide, N-($C_1$ to $C_{22}$)alkyl-N-vinylacetamide, N-vinyl propionamide, N-($C_1$ to $C_{22}$) alkyl-N-vinyl propionamide, (meth)acrylic acid; the esters, nitriles, and amides of (meth)acrylic acid; vinyl acetate, vinyl propionate, vinyl alcohol, ($C_1$ to $C_{22}$)alkyl vinyl ethers, vinylpyrrolidone; polyetheramine; and copolymers thereof.

11. A process according to claim 7, wherein the B mer is N-vinylformamide, and the primary amine-containing polymer is a poly(vinylamine-co-vinylformamide) copolymer, or a salt thereof.

12. A process according to claim 7, wherein the B mer is N-vinylacetamide and the primary amine containing polymer is a poly(vinylamine-co-vinylacetamide), or a salt thereof.

13. A process according to claim 7, wherein the primary amine-containing polymer includes at least two B mer units.

14. A process according to claim 13, wherein the primary amine-containing polymer is a poly(vinylamine-co-vinylformamide-co-diallyldimethylammonium chloride) terpolymer, or a salt thereof.

15. A process according to claim 13, wherein said B mer units are N-($C_6$ to $C_{22}$)alkyl acrylamide and vinylformamide.

16. A process according to claim 15, wherein the primary amine-containing polymer is a poly(vinylamine-co-vinylformamide-co-N-t-octylacrylamide) terpolymer, or a salt thereof.

17. A process according to claim 1, wherein the primary amine-containing polymer is branched.

18. A process according to claim 1, wherein the weight average molecular weight of the primary amine-containing polymer is from 300 Daltons to 300,000 Daltons.

19. A process according to claim 1, wherein the percentage of primary amine in the polymer is from 45 mole % to 100 mole % based on the total percentage of mer units in the polymer.

20. A process according to claim 19, wherein the percentage of primary amine in the polymer is from 55 mole % to 100 mole % based on the total percentage of mer units in the polymer.

21. A process according to claim 7, wherein the percentage of primary amine in the polymer is from 45 mole % to 99 mole % based on the total percentage of mer units in the polymer.

22. A process according to claim 21, wherein the ratio of primary amine in the polymer is from 60 mole % to 99 mole %.

23. A process according to claim 1, wherein the scale produced contains at least one species of scale-forming ion selected from the group consisting of $Na_2SiF_6$; $K_2SiF_6$; $CaSO_4+2\ H_2O$; $CaSO_4+\frac{1}{2}\ H_2O$; $CaSO_4$; $MgSiF_6+6\ H_2O$; $Ca_3(PO_4)_2$; $CaHPO_4$; $Si_2F_6$; $CaSiF_6+2\ H_2O$; $CaF_2$; $MgF_2$; $Mg_{0.8}Al_{1.5}F_6+X\ H_2O$, wherein X is an integer ranging from 2 to 10; $MgH_2P_6O_7$; $Al(PO_3)_3$; $NaK_2AlF_6$; $Ca_3(AlF_6)_2+4\ H_2O$; $MgNaAlF_6+2\ H_2O$; and $Ca_4SO_4AlSiF_{13}+10\ H_2O$.

24. A process according to claim 1, wherein the reagent is added to any of the interstitial piping of the phosphoric acid production plant and/or to one or more stages of the phosphoric acid production process selected from the group consisting of the milling stage; the digesting stage; the filtering stage; the evaporation stage; and the clarifying stage.

25. A process according to claim 1, wherein the scale-inhibiting amount of reagent added to the wet process phosphoric acid production process is from 0.5 g per ton to 5000 g per ton of phosphoric acid.

* * * * *